United States Patent [19]

Tashiro et al.

[11] Patent Number: 5,016,061
[45] Date of Patent: May 14, 1991

[54] RECIRCULATING AUTOMATIC DOCUMENT FEEDER

[75] Inventors: Osamu Tashiro, Osaka; Masafumi Okumura, Yamatokoriyama, both of Japan

[73] Assignee: Sharp Kabushiki Kashia, Osaka, Japan

[21] Appl. No.: 341,219

[22] Filed: Apr. 21, 1989

[30] Foreign Application Priority Data

Apr. 21, 1988 [JP] Japan ................................. 63-98793
Jun. 10, 1988 [JP] Japan ................................ 63-143947

[51] Int. Cl.$^5$ ........................................... G03G 21/00
[52] U.S. Cl. .............................. 355/320; 271/3.1; 271/291; 271/301; 271/902; 355/24; 355/318
[58] Field of Search ................ 355/320, 319, 24, 23, 355/318; 271/902, 184, 186, 291, 301-304, 3.1

[56] References Cited

U.S. PATENT DOCUMENTS

| | | | |
|---|---|---|---|
| 4,140,387 | 2/1979 | Gustafson | 355/319 |
| 4,319,833 | 3/1982 | Hidding | 355/23 |
| 4,345,751 | 8/1982 | Holzhauser | 271/3.1 |
| 4,744,553 | 5/1988 | Hirose | 355/23 X |
| 4,815,722 | 3/1989 | Sugimoto | 271/301 X |

Primary Examiner—A. T. Grimley
Assistant Examiner—Robert Beatty

[57] ABSTRACT

An automatic document feeder having a recirculating conveying path with a first switchback means between the document hopper and a presentation area interfacing with the scanning exposure region of an optical reading apparatus and a second switchback means between the presentation area and the document hopper, each such switchback means being selectively operable to either invert the surfaces or reverse the leading and trailing edges of the document for presentation at the presentation area, so as to facilitate document handling in the event of jamming and to reduce the size of the feeder. Additionally, the feeder can be used in correspondence with a copying machine having a conveying path with a third switchback means located between a photosensitive drum and an intermediate tray for reversing the leading and trailing edges of the copying paper and a fourth switchback means located between the photosensitive drum and a discharge hopper for inverting the surfaces of the copying paper.

9 Claims, 7 Drawing Sheets

RECIRCULATING AUTOMATIC DOCUMENT FEEDER

BACKGROUND OF THE INVENTION

1. Field of the Invention

The present invention relates to a recirculating automatic document feeder (RADF) or recirculating document handler (RDH) used for sequentially feeding the original documents to an exposure region in various optical reading units such as electrostatic copying apparatus and image scanner.

2. Description of the Prior Art

When copying images on face and back sides of a plurality of original documents automatically and continuously, the documents finishing the copying process for the images on one side must be inverted upside down, and the images on the opposite side must be subjected to copying process again. For this purpose, the conventional copying apparatus is provided with a so-called RADF having means for switching back or for inverting the leading and trailing edges of the documents only by a reciprocating motion, in part of the conveying route composed in a loop shape. In such RADF, a plurality of documents are placed on a hopper, and the documents are led out to the exposure region one by one, and the documents finishing the copying process for the images on one side are inverted by the switchback means to be returned to the hopper. By performing this process continuously for the number of documents, the copying process of the images on one side of the documents placed on the hopper is completed. At this time, the plurality of documents are placed on the hopper in the state upside down from the initially installed state. When the documents placed in the inverted state are led to the exposure region, the opposite side of the surface exposed in the first copying process is exposed, so that the opposite side may be subjected to an exposure process. By inverting the documents finishing the second copying process by the switchback means and returning to the hopper, the documents finished in copying process on both sides are put on the hopper in the initial state.

In such conventional RADF, however, since the documents finishing the first copying process are inverted and put on the hopper, when attempted to repeat the first copying process due to jamming occurring in the copying process, the job to return the documents to the initially placed state is bothersome.

To eliminate this problem, it has been proposed to use two hoppers, in which the documents finishing the copying process of the images on one side are placed in a second hopper from the first one initially put on, and in the second copying process, the documents are fed from this second hopper, and the documents finishing the copying process of the images on two sides are returned to the first hopper. In this method, since two hoppers are used, the size of the apparatus increases.

Figure 1:
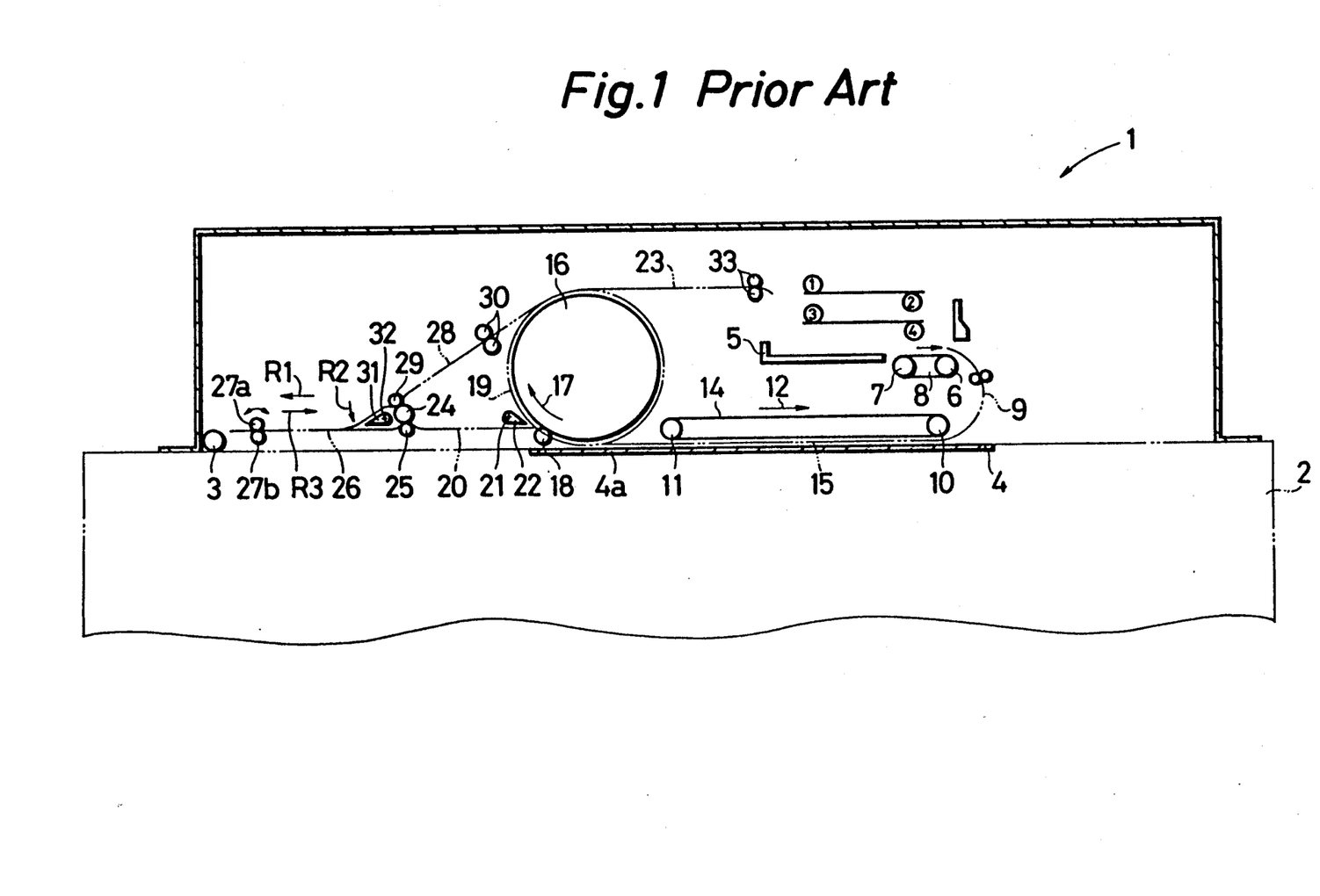
FIG. 1 is a sectional view showing a basic structure of RADF 1 of a typical prior art.

A typical prior art is shown in FIG. 1, in which a recirculating automatic document feeder (RADF) 1 is mounted on the upper surface of a main body 2 of electrostatic type copying apparatus so as to be free to be dislocated angularly about a rotary shaft 3. On the upper surface of the main body 2 is disposed an original platen 4 made of hard glass or the like on which the document is placed by the operator when the RADF 1 is not used. While the automatic document feed by the RADF 1 is not effected, the exposure means (not shown) which is incorporated in the main body 2 and is designed to expose by scanning the document is conveyed by the driving means in the copying apparatus main body, and the document put on the original platen 4 in this way is scanned and exposed in one direction from its one end to the other end.

On the other hand, when the automatic document feed by the RADF 1 is conducted, the exposure means is stopped at a position for exposing the exposure region 4a. In the RADF 1, on an original hopper 5 on which the original documents can be stacked up, a plurality of paginated documents having images formed on both sides and are sequentially placed with the first page on the top. Such state is schematically shown in FIG. 1, in which encircled numerals 1 to 4 denote the page numbers attached to the documents.

The plurality of documents placed on the original hopper 5 are sequentially drawn out from the bottom side one by one by means of paper feed belt 8 entrained on rollers 6 and 7 rotated and driven by driving means such as a motor which is not shown, and are led to a conveying route 9 one by one. The conveying route 9 extends in the widthwise direction of the original (the direction perpendicular to the sheet of paper of FIG. 1), and the section perpendicular to the widthwise direction is approximately semicircumferential and is uniform in the widthwise direction, and its outlet is located near one end of the original platen 4.

In relation to the original plate 4, a conveying belt 14 is entrained on rollers 10, 11 and is circulated and driven in the direction of arrow 12. This conveying belt 14 functions as means for pressing the documents onto the original platen 4 when copying them while documents such as a book are placed on the original platen 4 without using the RADF 1. When the RADF 1 is activated and the documents are fed automatically, the documents coming from the outlet of the conveying route 9 are conveyed through a route 15 between the conveying belt 14 and the original platen 4 by the frictional force between the conveying belt 12 and the document surface. In this way, the documents are sequentially led into an exposure region 4a.

Relative to the exposure region 4a, an original drum 16 in a shape of right circular cylinder having an axial line extending parallel to the exposure region 4a is disposed. The original drum 16 is rotated and driven in the direction of arrow 17 by driving means which is not shown, and the document coming out of the route 15 is taken up on the original drum 16 by the function of driven roller 18 and others and is conveyed.

Near the driven roller 18, the conveying route is branched into a conveying route 19 and a conveying route 20. In relation to the branching position is disposed a gate flapper 22 which is angularly dislocated by driving means containing a solenoid and other elements (not shown) around a rotary axial line 21, and is designed to lead the document to either one of the conveying routes 19, 20. The document coming out through the conveying route 19 is conveyed as being taken up on the original drum 16, and is returned to the original hopper 5 from the conveying route 23. The returning document is put on the top of the stack of documents in the original hopper 5.

The document led into the conveying route 20 contacts with a roller 24, and is held between this roller 24 and a roller 25 disposed in relation to the conveying route 20, and is further sent into a conveying route 26.

Relative to the conveying route 6, a roller 27a rotated and driven in normal and reverse directions, and a driven roller 27b contacting with this roller 27a are disposed. Being branched off from the conveying route 26, a conveying route 28 continuous with the conveying route 23 is provided. In relation to this conveying route 28, a roller 29 contacting with the roller 24, and a pair of rollers 30 are installed. At the position where the conveying route 28 is branched off from the conveying route 26, a gate flapper 31 for leading the document sent to the conveying route 26 further into the conveying route 28 securely is provided.

The document set to the conveying route 20 is carried in the direction of arrow R1 until its trailing edge passes through the branching part of the conveying routes 26, 28 due to the rotation and driving of the roller 27a. When the document is conveyed up to the position of passing through the branching part, the rotating direction of the roller 27a is reversed. At this time, the gate flapper 31 is angularly dislocated in the direction of arrow R2 around a rotary axial line 32. As a result, the document is conveyed in the direction of arrow R3, and is led into the conveying route 28 by the function of the rollers 24, 29, and others.

The document coming from the conveying route 28 is guided by the conveying route 23, and is put on again from the top side on the original hopper 5 by the function of the pair of rollers 33.

For exposing the both sides of the plural documents stacked on the original hopper 5, first the documents are circulated, one by one, in a loop of conveying route 9, conveying route 15, and conveying routes 20, 26, 28, 23. In this way, the document surfaces of all odd pages of all documents stacked on the original hopper 5 are exposed. After the first feeding cycle of the documents for exposure, the documents are stacked on the original hopper 5 with the odd pages down.

In the second feeding cycle of the documents for exposure, it is the even pages that are exposed in the exposure region 4a. In this case, too, same as in the first feeding cycle, the documents are circulated in a loop of the conveying route 9, route 15, and conveying routes 20, 26, 28, 23. When the second feeding cycle of exposure is thus over, the plurality of the documents are stacked up on the original hopper 5 in the same state as in the initial state.

To expose the documents plural times continuously, the documents are led into the conveying route 19 by the function of the gate flapper 22 from the route 15, and are taken up on the original drum 16 and conveyed. In this way, the same side of the documents is exposed plural times in the exposure region 4a.

In such prior art, the documents finishing the first feeding cycle of the documents for exposure are stacked up on the original hopper 5 upside down in the initial state. Therefore, if attempted to repeat the exposure due to, for example, jamming in the conveying routes 9, 20, 23, 26, 28 or route 15, the job to restore the documents into the initial stack-up state is bothersome.

SUMMARY OF THE INVENTION

It is hence a primary object of the invention to present a recirculating automatic document feeder having, by solving the above technical problems, switchback means disposed between a hopper and exposure region, and between exposure region and the hopper, on the way of the recirculating conveying loop from the hopper to return to the hopper via the exposure region, wherein two copying processes are done so as to make these two switchback means valid or invalid at the same time, the face and back sides of the documents are inverted at the exposure region, and the state of the original documents initially put on the hopper is maintained, so that the handling of the documents in the event of jamming occurring in the documents recirculating route may be facilitated, while the size of the apparatus may be reduced.

In order to achieve the above object, the invention presents a recirculating automatic document feeder (RADF) which comprises:

a hopper for receiving a stack of the original documents, a loop-shaped conveying route for conveying the documents from the bottom of the hopper to the top of the hopper by way of the exposure region continuously, first switchback means situated on the way to part of the conveying route from the hopper to the exposure region for switching back the documents selectively.

second switchback means situated on the way to part of the conveying route from the exposure region to the hopper for switching back the documents switched back by the first switchback means.

According to a preferred embodiment of the invention, the RADF comprises control means whereby the lowermost one of the plurality of documents stacked up on the hopper is switched back by the first switchback means before exposure, and is switched back by the second switchback means after exposure and returned to the top of the documents stacked up on the hopper in the first feeding cycle of the documents, and the lowermost one of the documents on the hopper is recirculated through the conveying route in the second feeding cycle of the documents to be returned to the top of the documents stacked up on the hopper.

According to another preferred embodiment of the invention, the RADF comprises control means whereby the lowermost one of the plurality of documents stacked up on the hopper is recirculated through the conveying route in the first feeding cycle of the documents to be returned to the top of the documents stacked up on the hopper, and the lower one of the documents stacked up on the hopper is switched back by the first switchback means before exposure, and is switched back by the second switchback means after exposure and returned to the top of the documents stacked up on the hopper in the second feeding cycle of the documents.

In the invention, the original documents put on the hopper are conveyed in the continuous loop-shaped conveying route from the bottom of the hopper to the top of the hopper via the exposure region. In the midst of this conveying route, while being led out from the hopper to the exposure region, the documents are selectively switched back by the first switchback means. Moreover, of the documents passing through the exposure region in the conveying route, the documents switched back by the first switchback means are switched back again by the second switchback means.

That is, the documents not switched back by the first switchback means are not switched back by the second switchback means. Therefore, the documents being conveyed in the conveying route are either not switched back at all, or switched back twice.

The documents being conveyed without being switched back coincide with the initially installed face-back state when returning to the hopper by way of the loop-shaped conveying route. When the optical device of the copying apparatus is opposite to the conveying route from the lower side, the top one of the documents on the hopper is exposed.

On the other hand, the documents switched back twice in the loop-shaped conveying route are in the same state as in the document stack when returning to the hopper. At this time, the bottom one of the documents on the hopper are exposed by the optical device.

In this way, when the two-sided documents stacked on the hopper are all supplied with the two switchback means set in valid state, and then supplied with the two switchback means set in invalid state, the images on both sides of all documents can be subjected to the copying process, and in the midst of copying of both sides, the face-back state of documents on the hopper are always the same as in the initial stack. The same holds true when the two switchback means are set in invalid state when conveying the documents first, and set in valid state the second time.

Therefore, according to the invention, in each one of the two operations of conveying the documents with two sides stacked on the hopper, by setting the first switchback means and the second switchback means in valid state, and setting the both switchback means in invalid state in the second time, the exposure sides of the first and second conveying can be changed over, and the documents can be always returned onto the hopper in the initial stackup state.

Hence, the copying process of two-sided documents can be easily executed, and processing of documents on the hopper is easily accomplished when a paper jamming occurs. In addition, in the loop-shaped conveying route, two switchback means can be installed before and after the exposure region, and it is not necessary to provide the switchback means with a tray or the like for holding the documents, and plural hoppers are not needed, so that the apparatus may be compact in structure.

The invention also presents a recirculating automatic document feeder having a recirculating route for sequentially conveying the plurality of documents stacked up on a hopper, exposing a document in an exposure region, and stacking up on the documents again in the hopper, comprising:

means for feeding out from the lowermost one of the documents to convey the documents stacked up on the hopper; and the recirculating route having a first conveying route for inverting the withdrawn document upside down, and for leading to the exposure region, a second conveying route for leading the withdrawn document to the exposure region without inverting, a third conveying route for inverting the document conveyed from the exposure region upside down, and for leading to the hopper, and a fourth conveying route for leading the document conveyed from the exposure region without inverting, wherein the document passing through the first conveying route is led to the third conveying route, the document passing though the second conveying route is led to the fourth conveying route, and when exposing both sides of the document, the document is led to the second conveying route of the recirculating route in the first feeding cycle and to the first conveying route in the second feeding cycle. According to a preferred embodiment of the invention, the document passing through the first conveying route is led to third conveying route, the document passing through the second conveying route is led to the fourth conveying route, and when exposing both sides of the document, the document is led to the first conveying route of the recirculating route in the first feeding cycle and to the second conveying route in the second feeding cycle.

In this invention, the plurality of original documents stacked on the original hopper are sequentially drawn out and conveyed by the conveying means from the bottom of the stack. When exposing the face and back sides of the document being drawn out, in the first session, the withdrawn original is inverted and is let into the first conveying route which further leads to the exposure region. The document passing through the first conveying route is led into the third conveying route for inverting the document sides after the exposure region, from which it is stacked again on the original hopper. In the second session, the withdrawn document is led into the second conveying route which leads to the exposure region while maintaining the document face-back relation of the stack on the original hopper. The document passing through the second conveying route passes through the exposure region, and is led into the fourth conveying route which leads the document to the original hopper while maintaining the face-back relation in the exposure region.

In this way, the plurality of original documents stacked on the original hopper are not involved, and if a jamming should happen in the midst of the recirculating route, it is not necessary to invert the sides of the documents when performing the first exposure again, and it is relatively easy to restore the plurality of documents in the state initially stacked on the original hopper.

According to the invention, therefore, the face-back relation of the plurality of documents stacked on the original hopper is always kept the same in the state being stacked on the original hopper. In the event of a jamming accident in the original recirculation route, for example, the job to return the plurality of documents into the initial state stacked up on the original hopper can be done easily and in a short time, so that handling of original documents may be extremely easy.

The invention presents an electrostatic copying apparatus comprising an automatic document feeder and a copying apparatus main body for copying the both sides of a copying paper corresponding to the both sides of a original document, wherein the automatic document feeder comprises:

(a1) a hopper for receiving a stack of the original documents, (a2) a loop-shaped conveying route for conveying the documents from the bottom of the hopper to the top of the hopper by way of the exposure region continuously, (a3) first switchback means situtated on the way of part of the conveying route from the hopper to the exposure region for switching back the documents selectively, (a4) second switchback means situated on the way of part of the conveying route from the exposure region to the hopper for switching back the documents switched back by the first switchback means; and the conveying apparatus main body comprises (b1) means for receiving copying papers to feed a sheet of copying papers one by one, (b2) means for copying the image of the original document passing through the exposure region on one side of the copying paper electrostatically, (b3) third switchback means for switching back the copying paper of which one side is copied by the electrostatic copying means, (b4) an intermediate tray for receiving the copying papers from the third switchback means to stack up on the top of the copying papers, (b5) means for conveying the lowermost one of the copying papers stacked up on the intermediate tray to the electrostatic copying means in the case where the second feeding cycle of the documents, and for copying the image of the original documents on the other side of the copying paper, and (b6) means for discharging the copying papers after the copying process to stack up from the top in the case where the second feeding cycle of the documents.

According to a preferred embodiment of the invention, the electrostatic copying apparatus comprises control means whereby the lowermost one of the plurality of documents stacked up on the hopper is switched back by the first switchback means before exposure, and is switched back by the second switchback means after exposure and returned to the top of the documents stacked up on the hopper in the first feeding cycle of the documents, and the lowermost one of the documents on the hopper is recirculated through the conveying route in the second feeding cycle of the documents to be returned to the top of the documents stacked up on the hopper.

According to another preferred embodiment of the invention, the electrostatic copying apparatus comprises fourth switchback means for switching back the copying paper from the electrostatic copying means in the case where the second feeding cycle of the documents in the document feeder, and means for discharging the copying paper from the fourth switchback means to stack up sequentially from the top.

According to a further preferred embodiment of the invention, the electrostatic copying apparatus comprises control means whereby the lowermost one of the plurality of documents stacked up on the hopper is recirculated through the conveying route in the first feeding cycle of the documents to be returned to the top of the documents stacked up on the hopper, and the lower one of the documents stacked up on the hopper is switched back by the first switchback means before exposure, and is switched back by the second switchback means after exposure and returned to the top of the documents stacked up on the hopper in the second feeding cycle of the documents.

BRIEF DESCRIPTION OF THE DRAWINGS

These and other objects of the invention, as well as the features and advantages thereof, will be better understood and appreciated from the following detailed description taken in conjunction with the drawings, in which.

DETAILED DESCRIPTION OF THE PREFERRED EMBODIMENTS

Referring now to the drawings, some of the preferred embodiments of the invention are described in details below.

Embodiment 1

Figure 3:
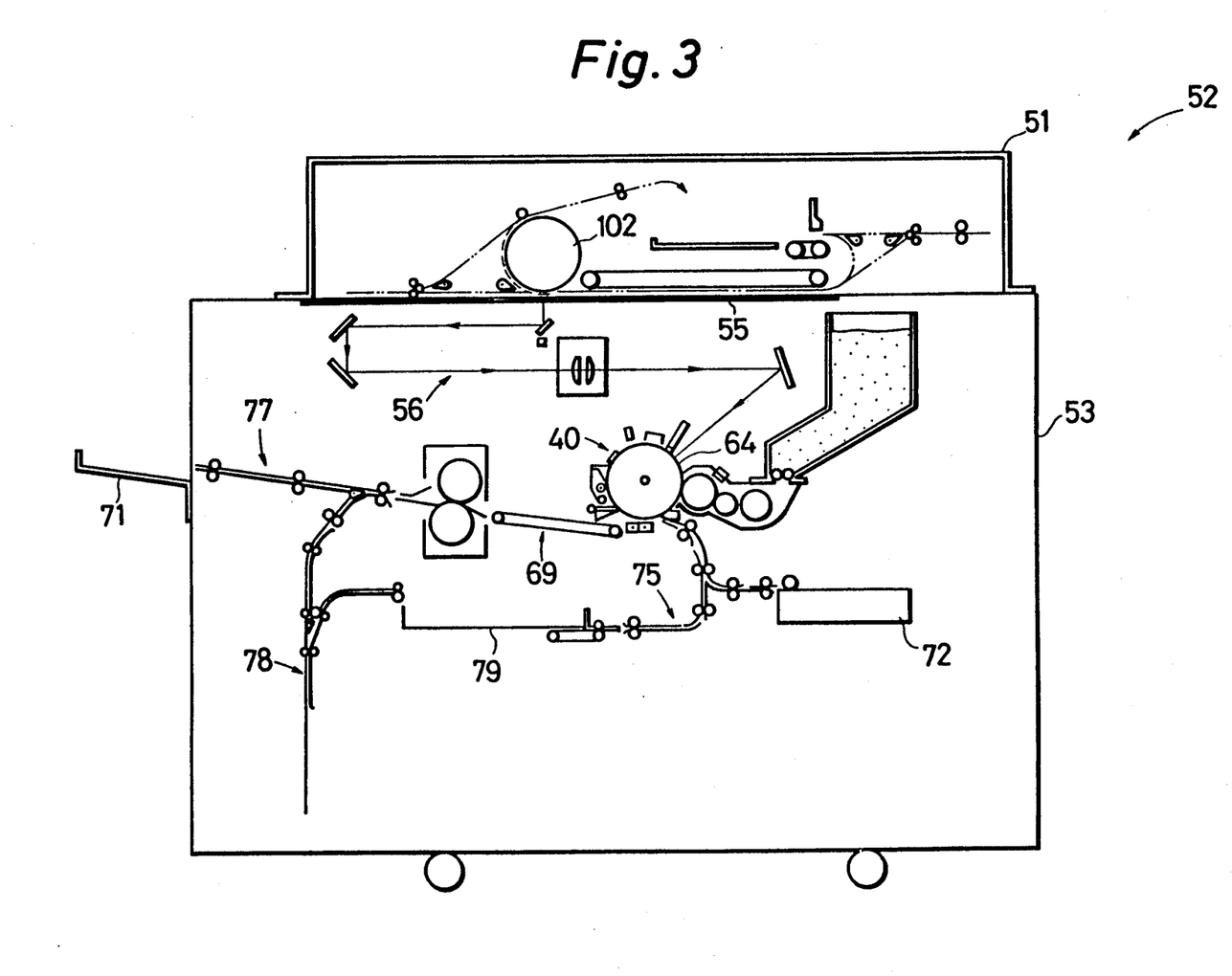
FIG. 3 is a front sectional view showing a simplified structure of a copying apparatus 52 mounting the RADF 51.

With reference to FIG. 3, a photosensitive drum 64 is rotatably installed in the middle of the inside of a copying apparatus main body 53, and composes a copying process block 40 together with other apparatus installed on its circumference. A paper cassette 72 is also provided inside the copying apparatus main body 53, and the paper contained in this paper cassette 72 is conveyed up to a paper receiving tray 71 by way of the copying process block 40 in a discharging route 77. From part of this discharge route 77, a paper feed route 75 passing through a inverting route 78 and an intermediate tray 79 is formed. The paper once finished in the copying process is switched back and is kept temporarily in the intermediate tray 79, from which the paper is sent out into the copying process block 40 by way of the paper feed route 75, so that the two sides of the paper are opposite to the photosensitive drum 64 by execution of two copying processes.

On the top of the copying apparatus main body 53, there is an original platen 55 made of a transparent hard glass. Beneath this original platen 55, there is an exposure means 56 composed of copy lamp, mirror and lens. In this exposure means 56, the light of the copy lamp is reflected by the original document X, and is projected on the surface of the photosensitive drum 64 by way of the mirror and lens. On the top of the original platen 55, an RADF 51 is openably mounted. In this constitution, the RADF 51 plays the role of original document X cover for covering the top of the original platen 55. The copy lamp of the exposure means 56 is capable of recriprocating over the entire length beneath the original platen 55, and is also designed to stop at a position opposite to the original drum 102 of the RADF 51.

Figure 2:
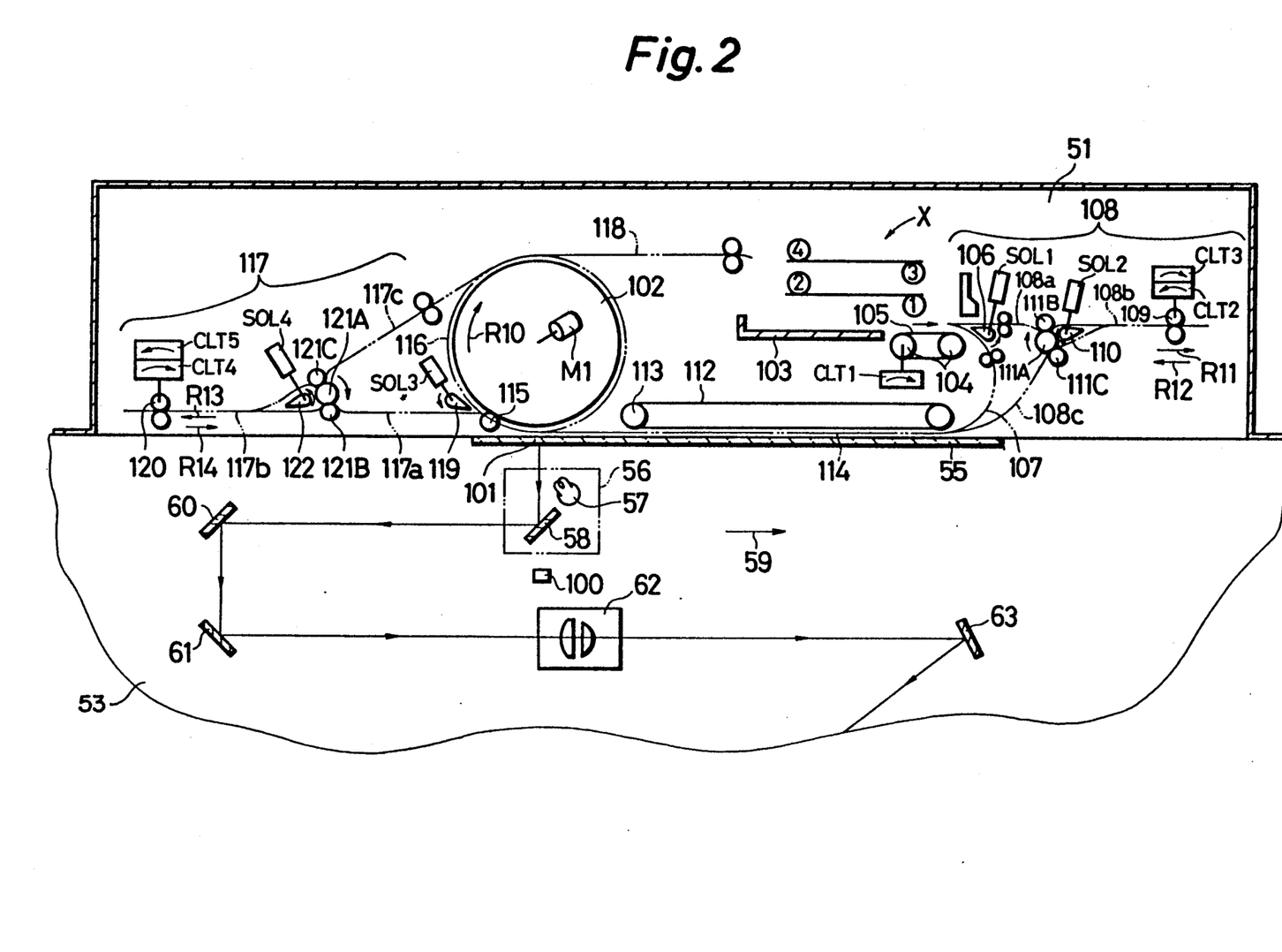
FIG. 2 is a sectional view showing an enlarged composition of a RADF 51 as an embodiment of the invention.

With reference to FIG. 2, the RADF 51 mounted on the top of the copying apparatus main body 53 covers the original platen 55. In the middle of this RADF 51, there is an original hopper 103 for receiving the original documents X. When mounting a plurality of two-sided original document X on the original hopper 103, the stack is set with the first page at the bottom. This original hopper 103 is provided with a paper feed belt 105, and a conveying route 114 to reach the exposure region 101 by way of a first conveying route 107 is composed. From the exposure region 101, a conveying route 118 is composed by way of third conveying route 116, which reaches the top of the original hopper 103 by way of the periphery of the original drum 102 opposite the copy lamp 57 at the exposure region 101. Therefore, the first conveying route 107, the conveying route 114, and the conveying route 118 compose a loop-shaped conveying route to reach from the bottom of the original hopper 103 to the top of the original hopper 103 by way of the exposure region 101.

The conveying route 114 is, in its part, branched off into a second conveying route 108 by means of a gate flapper 106. The second conveying route 108 comprises a gate flapper 110 and a conveying roller 109, and switches back the original document X by inverting the leading and trailing edges by the reciprocal motion alone. The second conveying route 108 communicates with the conveying route 114 through a conveying route 108C. The original drum 102 winds on its circumference the original document X relatively short in the scanning direction of the exposure means 56, and rotates in the direction of arrow R10 so as to scan the image of the original document X relative to the copy lamp 57 positioned beneath the exposure region 101.

The portion passing through the exposure region 101 of the conveying route 114 is branched off into a fourth conveying route 117 by means of a gate flapper 119. The fourth conveying route 117 comprises a gate flapper 122 and a conveying roller 120, and switches back the original document X by the rotation in the normal and reverse directions of the conveying roller 120. The fourth conveying route 117 communicates with the conveying route 118 by way of a conveying route 117C.

In the above composition, the torque from the motor M1 is transmitted to the original drum 102, the paper feed belt 105, conveying belt 112 and rollers in the conveying routes. From them, to the conveying roller 109, the rotation of the motor M1 selected in either normal or reverse direction by clutches CLT2, CLT3 is supplied, and to the conveying roller 120, the rotation of the motor M1 selected in either normal or reverse direction by clutches CLT4, CLT5 is similarly supplied. To the paper feed belt 105, the rotation of the motor M1 is selectively transmitted through a clutch CLT1. These clutches CLT1 to CLT5 transmit the rotation in the direction indicated by the arrow in the drawing when a supply voltage is applied. The gate flappers 106, 110, 119, 122 are drived by solenoids SOL1 to SOL4, and by driving these solenoid SOL1 to SOL4, the gate flappers 106, 110, 119, 122 move in the direction indicated by the arrow in the drawing.

When performing copying operation while conveying the original documents X by using this RADF 51, the exposure means 56 is detected by a detector 100, and this exposure means 56 is stopped at a position relating to an exposure region 101 shown in FIG. 2. Inside the RADF 51 at a position corresponding to the upper side of the exposure region 101 a right cylindrical original drum 102 having an axial line vertical to the sheet of paper of FIG. 2 is provided. This original drum 102 is rotated and driven in the direction of arrow R10 by means of motor M1.

In the RADF 51, a plurality of original documents X are mounted on an original hopper 103. In relation to the original hopper 103, the torque of the motor M1 is transmitted through the clutch CLT1, and a paper feed belt 105 is disposed, which is conveying means being wound on driving rollers 104 rotated and driven in the direction of arrow drawn in the clutch CLT1. By this paper feed belt 105, the plurality of documents X, the one at the bottom of the original hopper 103 is drawn out.

The document X being drawn out is selectively led into the first conveying route 107 or second conveying route 108 by means of a gate flapper 106 which is driven by solenoid SOL1. That is, when the solenoid SOL1 is de-excited, the gate flapper 106 closes the second conveying route 108, and releases the first conveying route 107. When the solenoid SOL1 is excited, the gate flapper 106 is angularly dislocated, and the first conveying route 107 is closed, and the second conveying route 108 is released.

The first conveying route 107 is formed, extending in the widthwise direction of the document X (the direction perpendicular to the sheet of paper of FIG. 2), and a section perpendicular to its longitudinal direction has an approximately semicircular shape, and the document X drawn out by the paper feed belt 105 is led to the vicinity of the original platen 55.

The second conveying route 108 comprises a first route 108a extending in the horizontal direction from the original hopper 103, a second route 108b communicating with the first route 108a, and a third route 108c branching off from the second route 108b and converging with the first conveying route 107 near the original platen 55. The torque of the motor M1 is transmitted through clutches CLT2, CLT3 to a conveying roller 109, and the conveying roller 109 is driven in normal and reverse directions in the directions of arrows in FIG. 2, so that the document X is conveyed in the direction of arrow R11, R12 in the second route 108b.

In relation to the position where the third route 108c is branched off from the second route 108b, a gate flapper 110 is provided, which is driven by the solenoide SOL2 to lead the document X led into the second route 108b securely into the third route 108c. A roller 111A is disposed in relation to the gate flapper 110. Rollers 111B, 111C commonly contacting with this roller, 111A are disposed in relation to the first and third routes 108a, 108c, respectively. While the solenoid SOL1 is de-excited, the first route 108a leads to the second route 108b, and when excited, the gate flapper 110 is angularly dislocated, and the first route 108a is closed to the second route 108b, while the second route 108b leads to the third routes 108c.

The document X led out to the vicinity of the original platen 55 from the first conveying route 107 or third route 108c of the second conveying route 108 is conveyed in the conveying route 114 formed between a conveying belt 112 and the original platen 55 by the conveying belt 112 disposed in relation to the original platen 55. This conveying belt 112 is wound on a driving roller 113 to which the torque from the motor M1 is transmitted through the mechanism not shown in the drawing.

The document X led to the vicinity of the exposure region 101 by the conveying belt 112 is held between the original drum 102 and a driven roller 115 which contacts with this exposure drum 102, and is wound on the original drum 102 and conveyed.

Near the driven roller 115, the conveying route of the document X is branched off into a third conveying route 116 and a fourth conveying route 117. The third conveying route 116 is a conveying route along the outer circumference of the original drum 102, and it is continuous with the conveying route 118 communicating with the upper side of the original hopper 103.

The fourth conveying route 117 comprises a first route 117a branching off in the horizontal direction near the driven roller 115 from the third conveying route 116, a second route 117b extending continuously from the first route 117a, and a third route 117c branching off from the second route 117b, converging with the third route 116 and communicating with a conveying route 118. At the position of the first route 117a branching off from the third conveying route 116, there is a gate flapper 119 which is driven by solenoid SOL3, and selectively leads the document X led out from the exposure region 101 into the third conveying route 116 or fourth route 117 by excitation or de-excitation of the solenoid SOL3. The torque of the motor M1 is transmitted through clutches CLT4, CLT5 to a conveying roller 120, and the conveying roller 120 is driveng in the direction of the arrow shown in FIG. 2, so that the document X is conveyed in the direction of arrows R13, R14 in the second route 117b.

In relation to the position where the third route 117c is branched off from the second route 117b, a driving roller 121A is disposed, and rollers 121B, 121C commonly contacting with this driving roller 121A are provided in relation to the first and third routes 117a, 117c, respectively. Furthermore, at the same branching position, there is a gate flapper 112 which is driven by solenoid SOL4, so that the document X from the second route 117b may be securely led into the third route 117c. While the solenoid SOL4 is de-excited, the first route 117a leads to the second route 117b, and when excited, the gate flapper 122 is angularly dislocated, and the first route 117a is closed to the second route 117b, while the second route 117b leads to the third route 117c.

Figure 4:
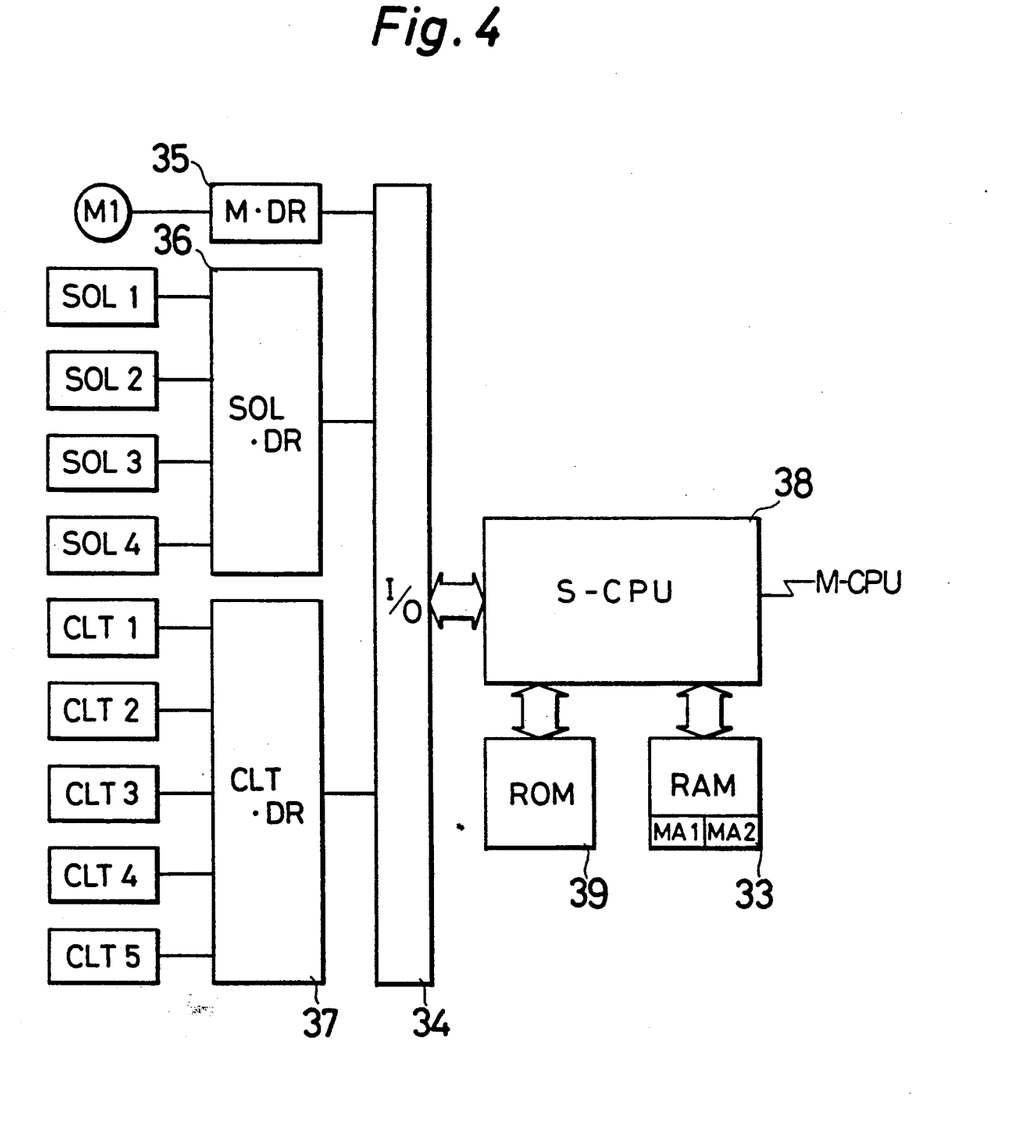
FIG. 4 is a block diagram of a control unit of the RADF 51.

FIG. 4 is a block diagram of the control unit of this RADF 51.

A slave central processing unit (S-CPU) 38 composing the control unit of the RADF 51 exchanges data with a master central processing unit (M-CPU) which composes the control unit of the copying apparatus main body 53 through a serial interface outside the drawing. To the S-CPU 38, a motor driver 35, solenoid driver 36, and clutch driver 37 are connected through interface (I/O) 34.

The motor driver 35 drives the motor M1, and the solenoid driver 36 drives the solenoids SOL1 to SOL4. The clutch driver 37 drives the clutches CLT1 to CLT5. According to the program preliminarily written into the read-only memory (ROM) 39, the S-CPU 38 delivers the control outputs of the motor, solenoids, and clutches to the motor driver 35, solenoid driver 36, and clutch driver 37. The motor driver 35, solenoid driver 36, and clutch driver 37 drive the motor, selenoids, and clutches according to the control data. The random-access memory (RAM) 33 is assigned in the working area, and the original number data N transmitted from the M-CPU is stored in the memory area MA1, and the memory area MA2 is assigned in a counter C which is described below.

Figure 5:
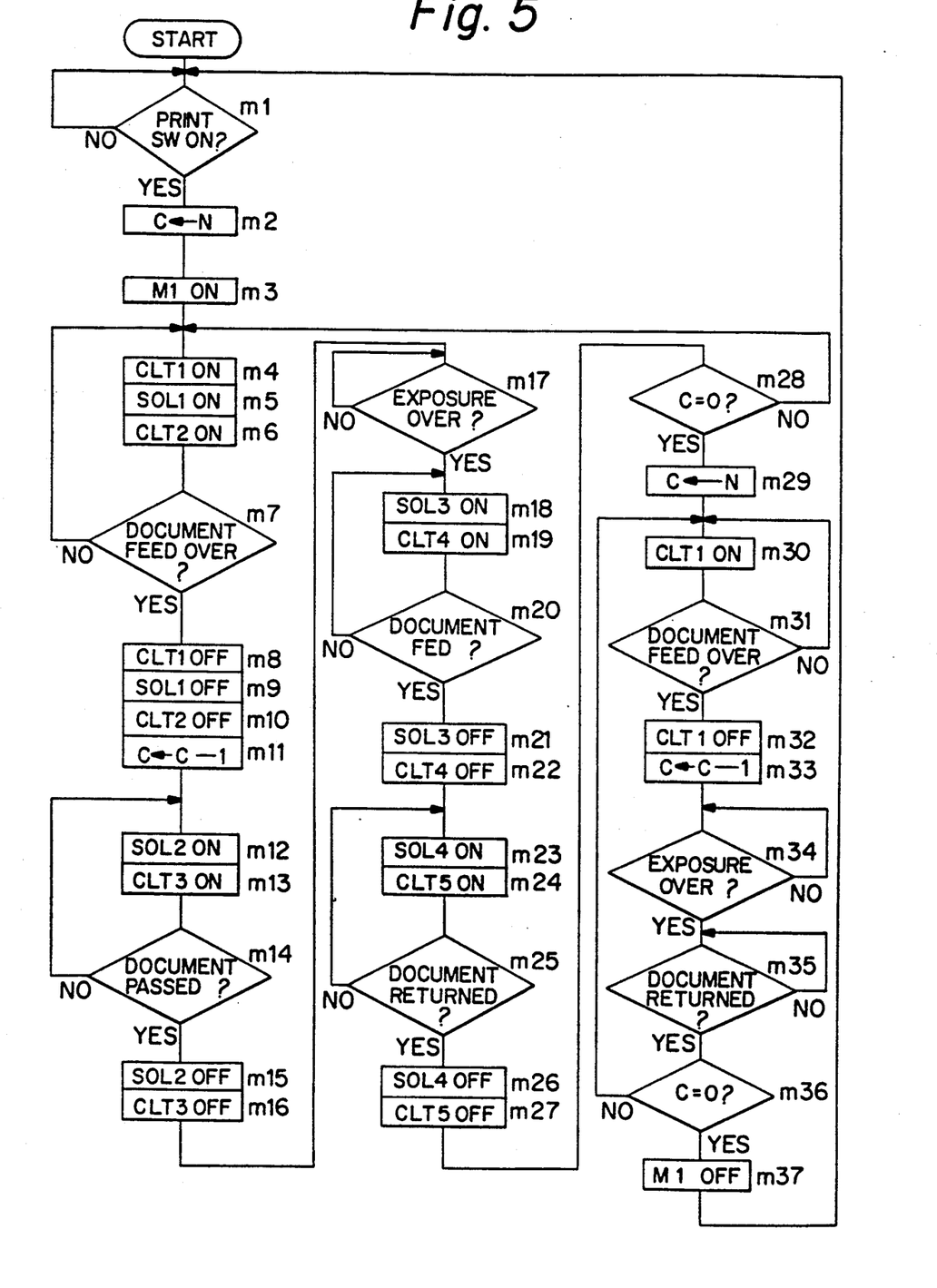
FIG. 5 is a flow chart showing the processing procedure of the control unit of the RADF 51.

FIG. 5 is a flow chart showing the processing procedure of the control unit of the RADF 51.

Prior the execution of the copying process of the two-sided originals, the number of original documents X is fed from the operation panel outside the drawing installed in the copying apparatus main body 53. This number of documents X is always transmitted from the M-CPU, and is stored as the document X number data N in the memory area MA1 of the RAM 33. The S-CPU 38, in this state, waits for operation of the print switch provided in the operation panel outside the drawing of the copying apparatus main body 53. When the print switch is operated (m1), the information of the document X number data N stored in the memory area MA1 is set in the content of the counter C assigned in the memory area MA2 (m2). This counter C counts the number of documents X not processed yet.

In succession, the motor M1 is driven (m3), and the clutch CLT1, solenoid SOL1, and clutch CLT2 are driven (m4 to m6). As a result, the paper feed belt 105 is put into rotation, and the gate flapper 106 moves downward, and the second conveying route 108 is opened. Consequently, the conveying roller 109 rotates counterclockwise. Of the original documents X placed on the original hopper 103, the leading edge of the lowermost one of the stack passes through the gate flapper 106 in the direction of arrow R11 to finish the feed of documents X (m7), when the clutch CLT1, solenoid SOL1 and clutch CLT2 are turned off (m8 to m10). At the same time, the content of the counter C is decremented (m11).

Afterwards, the solenoid SOL2 and clutch CLT3 are turned on (m12, m13), and the conveying route 108b leads to the conveying route 108c, and the documents X are moved in the direction of arrow R12. After the documents X pass through the gate flapper 110 in the direction of arrow R12, the solenoid SOL2 and clutch CLT3 are cut off (m14 to m16). As a result of steps m4 to m16, the original documents X supplied from the original hopper 103 are switched back in the second conveying route 108. It corresponds to the first switchback means together with the second conveying route 108 comprising the gate flappers 106, 110, conveying roller 109, solenoids SOL1, SOL2, and clutches CLT2, CLT3.

By the rotation of the motor M1, the conveying belt 112 and original drum 102 not provided with clutch are put in rotation in specified direction. As a result, the document X led into the conveying route 114 from the conveying route 108c is exposed to the copy lamp 57 at the exposure region 101. When this exposure is over (m17), the solenoid SOL3 and clutch CLT4 are turned on (m18, m19). In consequence, the gate flapper 119 moves upward, and the conveying route 114 leads to the conveying route 117, and the conveying roller 120 rotates clockwise at the same time, so that the document X is led into the direction of arrow R13 in the fourth conveying route 117. When the document X is conveyed over the position of the gate flapper 122 in the direction of arrow R13 (m20), the solenoid SOL3 and clutch CLT4 are cut off (m21, m22), while the solenoid SOL4 and clutch CLT5 are driven (m23, m24). In this way, the gate flapper 122 moves downward and the conveying route 117b leads to the conveying route 117c, while the conveying roller 120 rotates counterclockwise. Therefore, the document X is led in the direction of arrow R14 in the fourth conveying route 117, and is sent into the conveying route 118 through the conveying route 117c.

When the document X is discharged from the conveying route 118 to the top of the original hopper 103 (m25), the solenoid SOL4 and clutch CLT5 are cut off (m26, m27). As a result of steps m18 to m27, the documents X finished their exposure process are switched back in the fourth conveying route 117. It corresponds to the second switchback means of the invention together with the fourth conveying route 117 comprising the gate flappers 119, 122, conveying roller 120, solenoids SOL3, SOL4, and clutches CLT4, CLT5.

When the discharge or the documents X to the top of the original hopper 103 is over, the content of the coutner C is checked (m28), and the steps m4 to m27 are carried out continuously until the counter C reads zero. In this way, all original documents X stacked on the original hopper 103 are switched back before and after exposure process and are conveyed. Therefore, the downward image on the original hopper 103 is exposed by the copy lamp 57 at the exposure region 101, and the document X is discharged, with this side down, onto the top of the original hopper 103.

When the steps m4 to m27 are finished for all the original documents X mounted on the original hopper 103, the clutch CLT1 is driven (m30), and the original documents X are led into the first conveying route 107 from the lowermost one of the original hopper 103. When the trailing edge of the documents X passes through the paper feed belt 105 to finish the feed of the documents X (m31), the clutch CLT1 is cut of, and the content of the counter C is decremented (m32, m33). In this state, waiting for the end of exposure of documents X at the exposure region 101 and end of discharge from the conveying route 118 (m34, m35), the content of the counter C is checked (m36). Thus, all original documents X stacked on the original hopper 103 are executed in steps m30 to m35. When steps m30 to m35 are finished for all the documents X stacked on the original hopper 103, the motor M1 is stopped, and the operation returns to the step m1 (m37). In the processing of m30 to m35, the image on the top of the originals on the original hopper 103 is exposed to the copy lamp 57, and the document X discharged with this side up to the top of the original hopper 103.

According to this embodiment, a loop-shaped conveying route is formed from the bottom of the original hopper 103 to the top of the original hopper 103 by way of the exposure region 101, and on the way to conveying route, the second conveying route 108 and fourth conveying route 117 are composed at the right side and left side of the exposure region 101 respectively as shown in FIG. 2. By passing through the second conveying route 108 and fourth conveying route 117 in the first document conveying operation, and not leading to the second conveying route 108 and fourth conveying route 117 in the second conveying operation, the lower side of the document X on the original hopper 103 is exposed in the first document X conveying operation and the upper side of the document on the original hopper 103 is exposed in the second conveying operation, and the original document X may be always discharged onto the original hopper 103 in the initially stacked state in both first and second conveying operations. Therefore, by placing the original documents X with the first page down, continuously on the original hopper 103, the documents X may be copied on the copying paper sequentially. As a result, the copying papers are continuously discharged, with the first page down, on the paper receiving tray 71 of the copying apparatus main body 53, and it is not necessary to collate the pages after the copying process. It is the same, when the original documents X are set on the original hopper 103 with the final page down.

Besides, in the second conveying route 108 and fourth conveying route 117 disposed at both sides of the exposure region 101, since the documents X moves reciprocally due to contact with the rollers 109, 120, it is not necessary to install a tray for holding the documents X in this position, and it is also possible to discharge part of the documents X conveyed to the second conveying route 108 and fourth conveying route 117 outside the RADF 51 by opening the right and left sides of the RADF 51, so that the RADF 51 may be built in a compact structure. What is more, plural original hoppers 103 are not needed for stacking the documents X, and the structure of the RADF 51 is also compact in the vertical direction.

In this embodiment, meanwhile, first two switchback means are set valid in the first session and they are set invalid in the second session in two document X feed operations, but the same effects are obtained when the two switchback means are set invalid first, then valid next time. In such a case, however, if the pages of the documents X are consecutive, it is necessary to collate the pages of the copied paper in the paper receiving tray 71 after the copying process.

Another embodiment of the invention described below will solve the above technical problems.

Embodiment 2

Figure 6:
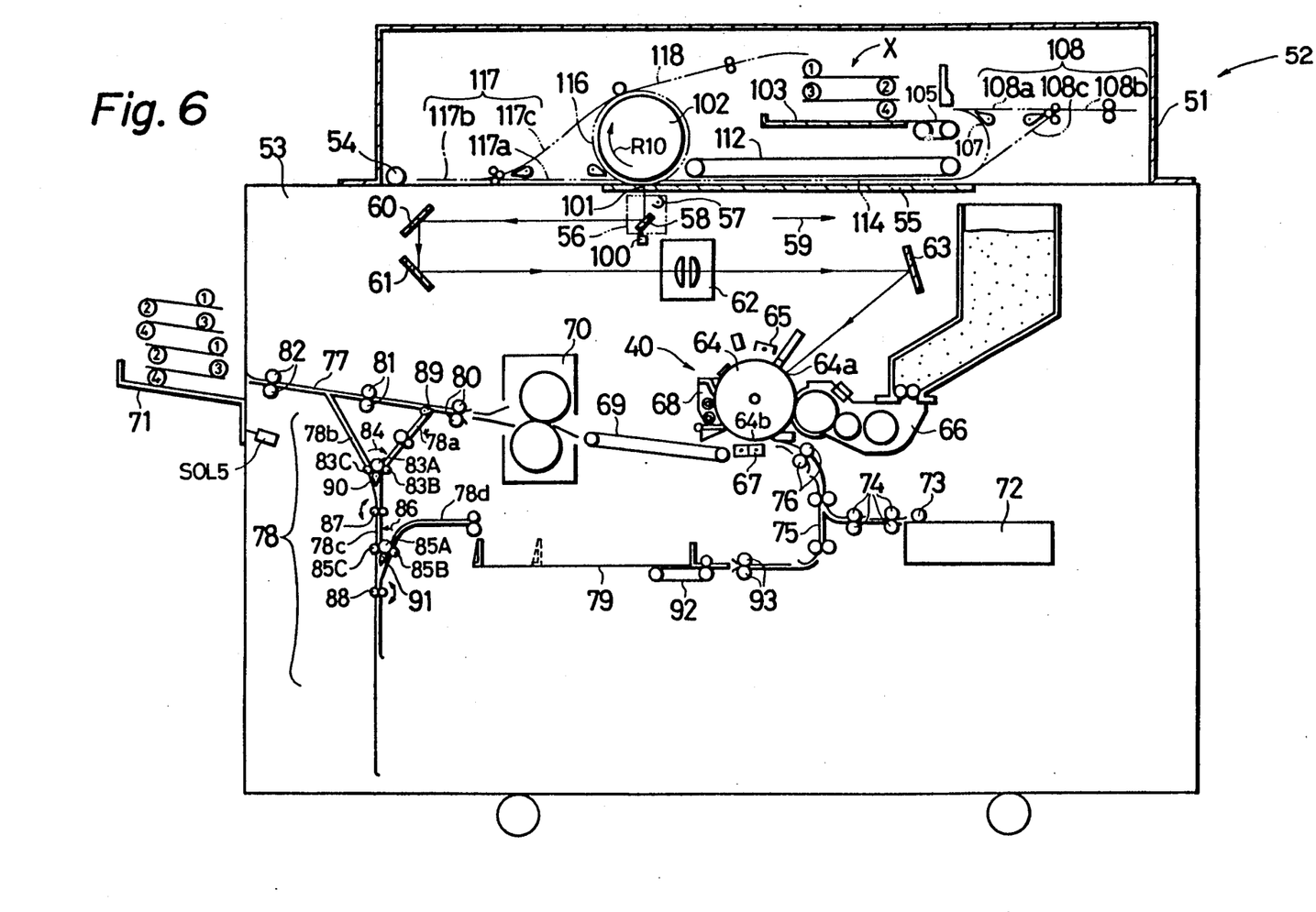
FIG. 6 is a sectional view showing a basic structure of a copying apparatus 52 having RADF 51 as an other embodiment of the invention.

FIG. 6 is a sectional veiw showing a basic structure of an electrostatic copying apparatus 52 having a recirculating automatic document X feeder (RADF) 51 as an other embodiment of the invention. The RADF 51 is mounted on the top of the copying apparatus main body 53 angularly dislocatable with respect to a rotary shaft 54. On the top of the copying apparatus main body 53, there is an original platen 55 made of hard glass or similar material. When the original document X is not fed by the RADF 51 (for example, when the original document X is a book), the document X is put on the original platen 55 with the copy side down, and the document X is pressed and fixed against the original platen 55 beneath the RADF 51, and the copying operation is done in this state.

Inside the copying apparatus main body 53, exposure means 56 is provided so as to be conveyed in the range of the installation of the original platen 55 at a position close to the original platen 55, extending in the direction perpendicular to the sheet of paper in FIG. 6. The exposure means 56 contains a copy lamp 57 realized by halogen lamp or the like, and a reflector 58. The exposure means 56 is conveyed by a mechanism not shown in the drawing in the direction of arrow 59 when scanning the document X in the state of the document X being stopped on the original platen 55, and the original platen 55 is scanned and exposed in this state.

The light generated from the copy lamp 57 is selectively absorbed in response to the original supported on the original platen. The reflected light from the original image is directed into an exposure region 64a of a right cylindrical photosensitive drum 64 having an axial line parallel to the longitudinal direction of the exposure means 56, being located near the middle of the inside of the copying apparatus main body 53, by means of reflectors 60, 61, zoom lens 62, and reflector 63, from the reflector 58. When the exposure means 56 is conveyed, the reflectors 60, 61 are also moved at the same time, and the length of the optical path from the exposure means 56 up to the exposure region 64a of the photosensitive drum 64 is kept constant.

The surface of the photosensitive drum 64 before exposure at the photosensitive drum 64 is uniformly charged by a corona discharger for charging 65 disposed along the outer circumference of the photosensitive drum 64, being extended in the axial direction of the photosensitive drum 64. When the surface of such photosensitive drum 64 is illuminated with the reflected light from the original image as mentioned above, the surface of the photosensitive drum 64 is selectively destaticized, and an electrostatic image is formed in this way. This electrostatic image is made visible into a toner image by a developing apparatus 66, and this toner image is transferred onto the copying paper after being conveyed by the structure described later near the transfer region 64b by the function of the corona discharger for transfer 67.

The toner remaining on the surface of the photosensitive drum 64 after transfer of the toner image is removed by a cleansing apparatus 68. The copying paper after transfer of the toner image is led into a fixing apparatus 70 by means of conveying belt 69, and the toner image is heated and fixed by this fixing apparatus 70. The copying paper passing through the copying process in this way is discharged onto a paper discharge tray 71 installed at one side of the copying apparatus main body 53 in the manner described below.

In the copying apparatus main body 53, a paper feed cassette 72 containing plural copying papers is installed. The copying papers contained in the paper feed cassette 72 are taken out one by one by a paper feed roller 73 which is rotated and driven in a state being pressed against the top sheet of the stack of copying papers, and are sent into the paper feed route 75 by means of conveying roller 74. Near the transfer region 64b of the paper feed route 75, a pair of resist rollers 76 are provided, and these resist rollers 76 are coupled to the drive shaft of drive means which is not shown inside the copying apparatus main body 53 by way of a clutch not shown. By the on/off control of the clutch, the copying paper can be transferred in synchronism with the toner image formed on the surface of the photosensitive drum 64.

Branching off from the discharge route 77 leading to the paper discharge tray 71 from the outlet of the fixing apparatus 70, an inverting route 78 is provided. This inverting route 78 is composed of first and second routes 78a, 78b branching off at mutually different positions from the upstream side of the conveying direction of the copying paper of the discharge route 77, a third route 78c extending downward from the converging part of the first and second routes 78a, 78b, and a fourth route 78d branching off from the third route 78c and reaching up to an intermediate tray 79. The combination of routes 78a, 78c and 78d comprises the third switchback means. In relation to the discharge route 77, pairs of conveying rollers 80, 81, 82 are disposed at spaced intervals.

In the inverting route 78, in relation to the converging position of the first and second routes 78a, 78b, a roller 83A is disposed, and rollers 83B, 83C commonly connected to this roller 83A are disposed in relation to the first and second routes 78a, 78b, respectively. The roller 83A is rotated and driven in the direction of arrow 84, which makes it possible to convey the copying paper from the first route 78a to the third route 78c, and from the third route 78c to the second route 78b. Moreover, in relation to the position of branching of the fourth route 78d from the third route 78c, a roller 85A is disposed, and rollers 85B, 85C commonly contacting with the roller 85A are disposed in relation to the fourth and third routes 78d, 78c, respectively. The roller 85A is rotated and driven in the direction of arrow 86, which makes it possible to convey the recording paper in the direction perpendicularly downward near the roller 85C, and also to convey in the direction toward the intermediate tray 79 in the fourth route 78d.

At the third route 78c near the converging position of the first and second routes 78a, 78b, a conveying roller 87 rotating in normal and reverse directions is disposed, and another conveying roller 88 rotating in normal and reverse directions is disposed in the third route 78c at the lower side of the position near the branching position of the fourth route 78d from the third route 78c. Furthermore, near the branching position of the first route 78a from the discharge route 77, a gate flapper 89 for selectively leading the copying paper from the fixing apparatus 70 to the discharge route 77 or first route 78a is disposed, and at the converging position of the first and second routes 78a, 78b, a gate flapper 90 for securely leading the copying paper from the third route 78c to the second route 78b is disposed, and at the branching position of the fourth route 78d from the third route 78c, a gate flapper 91 for securely leading the copying paper from the third route 78c to the fourth route 78d is disposed.

The copying paper stacked on the intermediate tray 79 has a copy image formed on its upper side. Such copying paper is taken out one by one a paper feed belt 92 from the stack of recording papers placed at the bottom side, and is led into the paper feed route 75 by means of conveying rollers 93.

The copying paper from the fixing apparatus 70 is able to be discharged in the following three manners.

1. To be discharged directly onto the paper discharge tray 71 by way of the discharge route 77.

2. To be led into the discharge route 77 again from the discharge route 77 through the first route 78a, third route 78c, and second route 78b, so as to be inverted, and discharged onto the paper discharge tray 71.

3. To be once stacked up on the intermediate tray 79 from the discharge route 77 through the first route 78a, third route 78c, and fourth route 78d, and led to the vicinity of the transfer region 64b of the photosensitive drum 64 through the paper feed route 75, and passed again through the fixing apparatus 70, and led into the discharge route 77 again from the discharge route 77 through the first route 78a, third route 78c, and second route 78b, and discharged onto the discharge tray 71.

Such discharge modes 1 to 3 of the copying paper are selected corresponding to the copy mode entered by the operator from the operation unit, not shown, installed in the copying apparatus main body 53. Plural detectors (not shown) are disposed at proper positions in the conveying route of the copying paper in the copying apparatus main body 53, and by detecting the copying paper by these detectors, the conveying rollers and gate flappers are driven, thereby realizing the conveying modes of the copying paper as described above.

When stacking for example, paginated original documents X having images on both sides on the original hopper 103 in the page number sequence, the documents X are stacked, for example, with odd pages up. Such stacking state of the documents X is simplified in FIG. 6, in which encircled numerals 1 to 4 denote the page numbers attached to the surfaces of the documents X.

When exposing both sides of such documents X, the document X drawn out from the original hopper 103 by the paper feed belt 105 is led into the first conveying route 107 by the function of the gate flapper 106, and is conveyed and exposed in the exposure region 101 by the conveying belt 112, and is led into the third conveying route 116 by the function of the gate flapper 119, and is returned on the original hopper 103 from the top side through the conveying route 118. Similarly, all the documents X initially stacked on the original hopper 103 are exposed once each on the odd page original surfaces in the exposure region 101, thereby finishing the exposure of the first session.

In the second feeding cycle of the documents X for exposure, the document X drawn out by the paper feed belt 105 is led into the second conveying route 108 by the gate flapper 106, and the even page original surfaces are exposed in the exposure region 101 through the conveying route 114. The document X after exposure is led into the fourth conveying route 117 by the gate flapper 119, and from this fourth conveying route 117, it is conveyed to the original hopper 103 through the conveying route 118, and is mounted on the top of the stack of plural documents X stacked on the original hopper 103. Similarly, the even page original surfaces of all documents X are exposed. In this way, the exposure of both sides of the documents X stacked on the original hopper 103 is over.

In the first feeding cycle of exposure, meanwhile, the document X drawn out by the paper feed belt 105 is inverted upside down in the first conveying route 107, and is inverted again in the third conveying route 116. Therefore, of the stack of documents X stacked again on the original hopper 103 by way of the conveying route 118, the odd page original surfaces are opposite to the upper side. In other words, in the same state of the initial stack of the documents X stacked on the original hopper 103, the documents X are placed again on the original hopper 103.

In the second feeding cycle of exposure, moreover, the documents X are led into the exposure region 101 while maintaining the same state stacked on the original hopper 103 by the function of the second conveying route 108. The documents X after exposure are led into the conveying route 118 while maintaining the state of the documents X in the exposure region 101 by the function of the fourth conveying route 117. Therefore, the documents X stacked again on the original hopper 103 have the odd pages opposite to the upper side, and the state is same as in the initial stack of the documents X stacked on the original hopper 103.

In this way, on the original hopper 103, the documents X are mounted in the same state as the initial stack mounted on the original hopper 103. Therefore, if, for example, a jamming occurs in the midst of conveying route, and it is necessary to start from the first exposure again, the job to restore the documents X in the initial stack state on the original hopper 103 is not difficult, and this job can be finished relatively in a short time.

At the time of the first exposure, the copying paper fed from the paper feed cassette 72 in the copying apparatus main body 53 is sequentially stacked up on the intermediate tray 79, after leaving the copying process, by way of the discharge route 77, first route 78a, third route 78c, and fourth route 78d, with the copy image formed side up.

At the time of the second exposure, the copying papers stacked up on the intermediate tray 79 are led into the vicinity of the transfer region 64b of the photosensitive drum 64 sequentially from the bottom copying paper through the conveying route 75 by means of the paper feed belt 92, and the other side is copied through the fixing apparatus 70. Afterwards, the copying paper from the fixing apparatus 70 is led out from the discharge route 77, and is sent again into the discharge route 77 by way of the first route 78a, third route 78c, and second route 78b so as to be inverted on sides, and stacked up on the paper discharge tray 71 in a state schematically shown in FIG. 6. The combination of routes 78a, 78c and 78b comprises the forth switchback means. At this time, the recording paper after copying mounted on the paper discharge tray 71 is stacked up so that the copy image side of the even page may be downward, and is arranged so that the copying paper of the copy image having the larger page number may come to the lowest side. The state of arrangement of copying papers on the paper discharge tray 71 is schematically shown in FIG. 6, in which encircled numerals 1 to 4 denote the page numbers formed on the copying paper sheets.

In this way, by performing the first and second exposures of the documents X plural times by the RADF 51, and conducting the above action of the copying apparatus main body 53 plural times, a plurality of copies will be obtained on the paper discharge tray 71. The paper discharge tray 71 is disposed in a direction perpendicular to the sheet of the paper of FIG. 6 by the solenoid SOL5. Excitation/de-excitation of the solenoid SOL5 is effected at every end of the first and second feeding cycle for exposure, so that the plurality of copies may be mounted on the paper discharge tray 71 in a sorted state.

Figure 7:
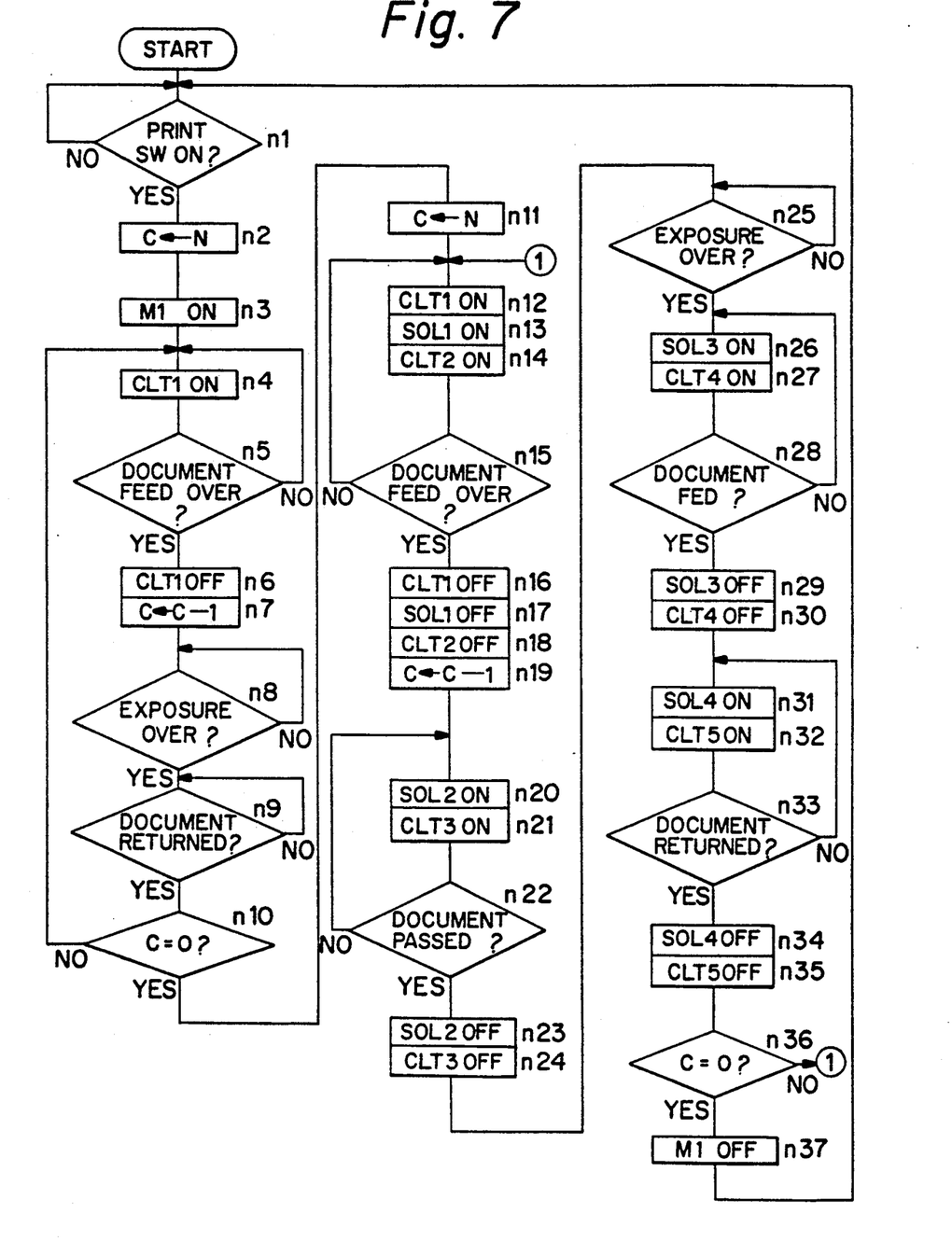
FIG. 7 is a flow chart showing the processing procedure of RADF 51.

FIG. 7 is a flow chart explaining the operation of the RADF 51 for copying a plurality of documents X having images formed on both sides. The RADF 51 is controlled by the S-CPU exchanging control information with the M-CPU (not shown) for controlling the action of the copying apparatus main body 53. The copying apparatus main body 53 is provided with, for example, an operation panel (not shown) on its upper surface, and this operation panel comprises numeric keys for entering the number of documents X to be copied, and print switch for instructing the start of copying action. When the operator enters the number of documents X to be stacked on the original hopper 103 by the numeric keys, the number of documents X is stored as the document X number data N in the RAM 33 connected to the S-CPU38.

At step n1, it is judged whether the print switch has been operated or not, and when operated, the operation advances to step n2, and the document X number data N is put into the parameter C corresponding to the number of documents X not copied yet.

At step n3, the motor M1 is turned on, and at step n4, the clutch CLT1 is driven. As a result, the torque of the motor M1 is transmitted to the driving roller 104, and in this way the document X placed at the bottom of the original hopper 103 is pulled out by the paper feed belt 105. At this time, since the solenoid SOL1 is being de-excited, the first convering route 107 is opened, and the drawn document X is led into the first conveying route 107.

At step n5, it is judged whether the document X feed action is finished or not, and if not finished, the operation returns to step n4. When the document X feed action is over, the operation advances to step n6, and the clutch CLT1 is turned off, and the paper feed belt 105 is stopped, while the parameter C is decremented at step n7.

At step n8, the document X led into the first conveying route 107 is led into the exposure region 101 through the conveying route 114, and it is judged whether the exposure of the original plane is over or not. The document X after exposure is, since the solenoid SOL3 is turned off, led into the conveying route 118 by way of the third conveying route 116.

At step n9, it is judged whether the stacking of the documents X on the top of the original hopper 103 through the conveying route 118 has been finished or not, and when this stacking is over, the operation advances to step n10.

At step n10, it is judged whether the parameter C is 0 or not. If not 0, the operation returns to step n4, and if 0, the operation advances to step 11. In this way, exposure of the one side of the documents X (odd pages) stacked on the original hopper 103 is sequentially executed, and when such first feeding cycle of the document X for exposure is over, the parameter C becomes 0, and the operation advances to step n11.

At step n11, the document X number data N is put into the parameter C. In succession, at step n12, the clutch CLT1 is driven. As a result, at step n13, the solenoid SOL1 is excited, and at step n14, the clutch CLT2 is driven. In this way, by the driving of the paper feed belt 105, the document X drawn out from the bottom of the original hopper 103 is conveyed and led in the direction of arrow R11 into the second route 108b by way of the first route 108a of the second conveying route 108. At this time, since the solenoid SOL2 is de-excited, the first route 108a leads to the second route 108b.

At step n15, it is judged whether the document X has been completely led into the second route 108, and if not supplied, the operation returns to step n10, and when the feed of the document X is over, the operation advances to step n16.

At step n16, the clutch CLT1 is cut off, and at the next step n17, the solenoid SOL1 is de-excited, and at step n18, the clutch CLT2 is cut off, and at step n19, the parameter C is decremented.

Next, at step n20, the solenoid SOL2 is excited, and the first route 108a is closed to the second route 108b, while the second route 108b leads to third route 108c. At step n21, the clutch CLT3 is driven, and the rotating direction of the driving roller 109 is inverted. Thus, the document X is conveyed in the direction of arrow R12, and is led into the third route 108c.

At step n22, it is judged whether the document X has passed through the second route 108 by means of a detector (not shown). When not passed, the operation returns to step n20, and when passed, it advances to step n23.

At step n23, the solenoid SOL2 is de-excited, and at step n24, the clutch CLT3 is turned off.

At step n25, the document X is led into the exposure region 101 through the conveying route 114, and it is judged whether the document X passes through the exposure region 101 or not. When the document X passes through the exposure region 101, the operation advances to step n26, and the solenoid SOL3 is excited, and the clutch CLT4 is excited at step n27. In this way, the third conveying route 116 is closed, and the document X is led into the first route 117a of the fourth conveying route 117. At this time, since the solenoid SOL4 is de-excited, the first route 117a leads to the second route 117b in the fourth conveying route 117. Therefore, the document X is led from the first route 117a into the second route 117b in the direction of arrow R13.

At step m28, it is judged whether the document X has been completely fed into the second route 117b or not, and if in the midst of the feeding (part of the document X is passing through the first route 117a), the operation returns to step n26, and when feeding is over, it advances to step n29.

At step n29, the solenoid SOL3 is de-excited, and the clutch CLT4 is turned off at step n30.

At step n31, the solenoid SOL4 is excited, and the clutch CLT5 is driven at step n32. As a result, the second route 117b is closed to the first route 117a, while the second route 117b leads to the third route 117c. By the driving of the clutch CLT5, the document X is conveyed in the direction of arrow R14. In this way, the document X is led into the third route 117c.

At step n33, it is judged whether the return of the document X from the second route 117b has been finished or not. If not finished, the operation goes to step n31, and if finished it advances to step m34.

At step n34, the solenoid SOL4 is de-excited, and the clutch CLT5 is cut off at step n35.

At step n36, it is judged whether the parameter C is 0 or not. If not 0, the operation returns to step n12, and if 0, it advances to step n37 to de-excite the motor n1, thereby returning afterwards to step m1. By the processing of steps n12 to n36, the second feeding cycle of the documents X for exposure is effected.

By such operation at the RADF 51, the plurality of documents X stacked on the original hopper 103 are maintained in the same state as the initial stack on the original hopper 103. Therefore, if a jamming or the like should occur in the conveying route of the documents X and it is necessary to repeat the copying action, the job to return the documents X to the initial stack state on the original hopper 103 is easy, and such restoring job can be done in a short time.

In the foregoing embodiment, the documents X are exposed by stopping the exposure means 56 at the lower side of the exposure region 101 in the exposure region 101, but it is also possible to expose the documents X by conveying the exposure means 56. That is, by controlling the action of the conveying belt 112 and original drum 102, and stopping the documents X to be exposed in the region on the original platen 55, the exposure means 56 may be conveyed in the direction of arrow 59 in FIG. 6, and the original plane opposite to the original platen 55 may be exposed.

Besides, in the foregoing embodiment, the RADF 51 is installed in an electrostatic copying apparatus 52, but it may be widely embodied in various optical reading devices for exposing by scanning the original plane.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A recirculating automatic document feeder for feeding original documents to a scanning exposure region of an optical reading apparatus for scanning exposure comprising:
    a document hopper for receiving a stack of the original documents;
    a loop-shaped feeder conveying route for continuously conveying the documents from the bottom of said document hopper to the top of said document hopper by way of the scanning exposure region;

first switchback means situated along part of said feeder conveying route from said document hopper to the scanning exposure region for selectively inverting the documents;

second switchback means situated along part of said feeder conveying route from the scanning exposure region to said document hopper for inverting the documents inverted by said first switchback means.

2. A document feeder as claimed in claim 1, further comprising control means whereby the lowermost one of the plurality of documents stacked up on said document hopper is inverted by said first switchback means before exposure, and is inverted by said second switchback means after scanning exposure and returned to the top of the documents stacked on said document hopper in the first feeding cycle of the documents, and the lowermost one of the documents on said document hopper is recirculated through said feeder conveying route in the second feeding cycle of the documents to be returned to the top of the documents stacked on said document hopper.

3. A document feeder as claimed in claim 1, further comprising control means whereby the lowermost one of the plurality of documents stacked on said document hopper is recirculated through said feeder conveying route in the first feeding cycle of the documents to be returned to the top of the documents stacked on said document hopper, and the lowermost one of the documents stacked on said document hopper is inverted by said first switchback means before scanning exposure, and is inverted by said second switchback means after scanning exposure and returned to the top of the documents stacked on said document hopper in the second feeding cycle of the documents.

4. A recirculating document feeder for sequentially conveying a plurality of documents stacked on a document hopper, exposing the documents at the scanning exposure region of an optical reading apparatus, and stacking the documents again in said document hopper, comprising:

means for feeding out the lowermost one of the documents to convey the documents stacked on said document hopper; and a recirculating route having a first conveying route portion for inverting the withdrawn document upside down, and for leading to the scanning exposure region, a second conveying route portion for leading the withdrawn document to the scanning exposure region without inverting, a third conveying route portion for inverting the document conveyed from the scanning exposure region upside down, and for leading to said document hopper, and a fourth conveying route portion for leading the document conveyed from the scanning exposure region to said document hopper without inverting, the document passing through said first conveying route portion is led to said third conveying route portion, the document passing through said second conveying route portion is led to said fourth conveying route portion, and when exposing both sides of the document, the document is led to said second conveying route portion of said recirculating route in the first feeding cycle and to said first conveying route portion in the second feeding cycle.

5. A recirculating document feeder for sequentially conveying a plurality of documents stacked on a document hopper, exposing the documents at the scanning exposure region of an optical reading apparatus, and stacking the documents again in said document hopper, comprising:

means for feeding out the lowermost one of the documents to convey the documents stacked on said document hopper; and a recirculating conveying route having a first conveying route portion for inverting the withdrawn document upside down and for leading the withdrawn document to the scanning exposure region, a second conveying route portion for leading the withdrawn document to the scanning exposure region without inverting, a third conveying route portion for inverting the document conveyed from the scanning exposure region upside down, and for leading to said document hopper, and a fourth conveying route portion for leading the document conveyed from the scanning exposure region to said document hopper without inverting, the document passing through said first conveying route portion is led to said third conveying route portion, the document passing through said second conveying route portion is led to said fourth conveying route portion, and when exposing both sides of the document, the document is led to said first conveying route portion of said recirculating route in the first feeding cycle and to said second conveying route portion in the second feeding cycle.

6. An electrostatic copying apparatus comprising a recirculating automatic document feeder and a copying apparatus main body for copying images at a scanning exposure region onto both sides of a copying paper corresponding to the images on both sides of an original document, said automatic document feeder including:

a document hopper for receiving a stack of the original documents, a loop-shaped feeder conveying route for continuously conveying the documents from the bottom of said document hopper to the top of said document hopper by way of said scanning exposure region, first switchback means situated along part of said feeder conveying route from said document hopper to the scanning exposure region for selectively inverting the documents, second switchback means situated along part of said feeder conveying route from said scanning exposure region to said document hopper for inverting the documents inverted by said first switchback means; and said copying apparatus main body including:

a main hopper for holding sheets of copying paper, means for sequentially feeding each of the sheets of copying paper from said main hopper, electrostatic copying means for copying the image of the original document passing through said scanning exposure region onto one side of the sheet of copying paper, third switchback means for reversing the leading and trailing edges of the sheet of copying paper on one side of which an image copy has been affixed by said electrostatic copying means, an intermediate tray for receiving the sheets of copying paper from said third switchback means to be stacked from the top, means for conveying the lowermost sheet of copying paper stacked on said intermediate tray to said electrostatic copying means during the second feeding cycle of the documents and for copying the image of the original document on the other side of the sheet of the copying paper, and means for discharging the sheet of copying paper after the copying process to stack from the top during the second feeding cycle of the documents.

7. An electrostatic copying apparatus as claimed in claim 6, further comprising control means whereby the lowermost one of the plurality of documents stacked on said document hopper is inverted by said first switchback means before exposure, and is inverted by said second switchback means after exposure and returned to the top of the documents stacked on said document hopper in the first feeding cycle of the documents, and the lowermost one of the documents on said document hopper is recirculated through said feeder conveying route in said second feeding cycle of the documents to be returned to the top of the documents stacked on said document hopper.

8. An electrostatic copying apparatus as claimed in claim 6, wherein the copying apparatus main body includes fourth switchback means for inverting the copying paper discharged from said electrostatic copying means in the second feeding cycle of the documents in said document feeder, and means for discharging the copying paper from said fourth switchback means to stack the copying paper sequentially from the top onto a discharge hopper.

9. An electrostatic copying apparatus as claimed in claim 8, further comprising control means whereby the lowermost one of the plurality of documents stacked on said document hopper is recirculated through said feeder conveying route in the first feeding cycle of the documents to be returned to the top of the documents stacked on said document hopper, and the lowermost one of the documents stacked on said document hopper is inverted by the first switchback means before exposure, and is inverted by said second switchback means after exposure and returned to the top of the documents stacked on said document hopper in the second feeding cycle of the documents.

* * * * *